United States Patent Office 3,004,051
Patented Oct. 10, 1961

3,004,051
EXTRACTION OF URANIUM VALUES FROM AQUEOUS SOLUTIONS
John C. Hillyer and Karl H. Hachmuth, Bartlesville, Okla., assignors to Phillips Petroleum Company, a corporation of Delaware
No Drawing. Filed Aug. 28, 1958, Ser. No. 757,655
7 Claims. (Cl. 260—429.1)

This invention relates to extraction of uranium values from aqueous solutions.

In the so-called carbonate leach process uranium values are extracted from ores with an aqueous solution containing a mixture of sodium carbonate and sodium bicarbonate. The ground ore is generally extracted at temperatures of 10 to 110° C. for periods of 0.5 to 4 days. During the leaching period the suspension is generally agitated and treated with an oxidant, such as potassium permanganate and aerated. The suspended solids are removed in any convenient manner such as by filtration and by decantation. A coagulant can also be used to improve separation of solids.

To recover the uranium from the clarified pregnant liquor, the liquor can be treated with sodium hydroxide in an amount sufficient to precipitate the uranium and generally in amount sufficient to provide an excess of 5 to 15 grams per liter. The alkaline slurry is commonly digested at 40 to 80° C. The precipitated uranium compounds are removed to give what is called a yellow cake. The resulting barren liquor can still contain a portion (e.g. to 20%) of the uranium. Some of the barren liquor is processed by treating with carbon dioxide, and thereby rendered suitable for recycling in the process. However, a portion of the barren liquor is generally discarded to avoid build-up in the concentration of undesirable impurities. This results in loss of the dissolved or suspended uranium.

This invention relates to a method for recovery of uranium values in alkaline liquors such as encountered in the carbonate leach process. By alkaline liquors it is meant aqueous systems having a pH generally above a value of 11.0 and commonly a pH above 11.5 and higher, e.g., to a pH as high as 13. Barren or semi-barren liquors from the carbonate leach process commonly have 5 to 15 grams free alkali (expressed as NaOH) per liter of solution. However, this invention is applicable to uranium-containing liquors other than obtained in the carbonate leach process. The liquors commonly contain from trace amounts (e.g. 0.001 percent) to amounts of 3 percent and higher of uranium expressed as $U_3O_8$.

The following are objects of our invention.

An object of our invention is to recover uranium values from aqueous solution. A further object of our invention is to eliminate loss of a portion of the uranium in discarded barren liquor. A further object of our invention is to provide a process using a combination extraction mixture for recovery of uranium from aqueous solutions.

Other objects and advantages will be apparent to one skilled in the art upon reading this disclosure.

The present invention is based upon the discovery that a portion of the uranium in aqueous solutions can be recovered by adding a compound, such as 8-hydroxyquinoline, and a quaternary ammonium compound mixed with an organic solvent with the aqueous solution. After thorough mixing, a portion of the uranium appears in the organic phase and can be recovered therefrom. Thus, the invention comprises a process for the recovery of uranium values from an aqueous alkaline solution, comprising adding a compound of the structure

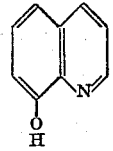

to form the corresponding uranium 8-quinolate, and 0.1 to 10 volumes per volume of said aqueous solution of an organic solvent not completely miscible under the conditions of treatment with said aqueous solution, said organic solvent containing 0.5 to 10 percent by weight of a compound of the structure

where X is an organic or inorganic anion such as those selected from the group consisting of chloride, iodide, bromide, sulfate, phosphate, acetate, and hydroxide, $n$ is the valence of X, and each R is individually selected from the group consisting of organic radicals containing 1 to 24 carbon atoms, the total number of carbon atoms in the sum of said R groups being in the range of 4 to 38, thoroughly mixing the resulting mixture, separating the aqueous and organic phases, said organic phase containing uranium values extracted from said aqueous phase.

In addition to the 8-hydroxyquinolines previously mentioned, derivatives of this compound can be used containing additional substituents on the ring. For instance, halogen containing derivatives such as 5,7-dibromo- and dichloro-derivatives are suitable.

The quaternary ammonium compounds used in this invention represent organic compounds having the structure

in which four carbon atoms are directly linked to the nitrogen atom and where the R groups can be the same and different organic radicals. The anion, X is inorganic or organic and can be, for example, chloride, iodide, bromide, fluoride, sulfate, phosphate, acetate or hydroxide and $n$ is the valence of X.

The R groups in the above formula can be any hydrocarbon radical having from 1 to 24 carbon atoms, and the total number of carbon atoms in the compound can vary from four to 38 carbon atoms. Commonly, the quaternary ammonium salt has two or more alkyl radicals. The organic radical may be paraffinic, olefinic, diolefinic, acetylenic or aromatic. Examples of these compounds are: dioctyl dimethylammonium chloride, didodecyl dimethylammonium chloride, dodecyl trimethylammonium chloride, dihexadecyl dimethylammonium hydroxide, hexadecyl trimethylammonium acetate, dioctadecyl dimethylammonium phosphate, octadecyl trimethylammonium sulfate, dioctadecenyl dimethylammonium chloride, dioctadecadienyl dimethylammonium chloride, hexadecyl octadecyl dimethylammonium chloride, octadecynyl trimethylammonium bromide, hexadecynyl trimethylammonium iodide, octyl trimethylammonium fluoride, cetyl trimethyl ammonium bromide, cetyl benzyl dimethylammonium chloride, octadecyl benzyl dimethylammonium chloride, octadecyl ethyl dimethylammonium bromide, dioctyl diethylammonium iodide, tetracosyl trimethylammonium chloride, didodecyl di-n-propyl ammonium sulfate, dicyclohexyl di-(2-methylpentyl)ammonium phosphate, 4-cyclohexenyl trivinylammonium acetate, diethyl diphenylammonium hydroxide, 2,4,6-trimethylbenzyl tri-(2-hexenyl)-ammonium chloride, propargyl tri-(n-octyl)ammonium chloride and di-(2-phenylpropyl) dibenzylammonium chloride. The chlorides and hydroxides are preferred. Alkyl trimethylammonium chlorides and dialkyl dimethylammonium chlorides are sold under the trademark "Arquad."

Mixtures of these compounds are also useful in the practice of this invention. Some of these mixtures are commercially available and represent crude or partly purified products and mixtures of two or more products. The following tabulation illustrates such products which are designated in terms of the materials from which derived.

| Trademark | Products | Quaternary ammonium Compounds, Percent |
|---|---|---|
| Aliquat 21 | Coconut trimethylammonium chloride. | 48–52 |
| Aliquat 26 | Monotallow trimethylammonium chloride. | 48–52 |
| Aliquat 221 | Dicoconut dimethylammonium chloride. | 23–77 |
| Aliquat H226 | Dihydrogenated tallow dimethylammonium chloride. | 73–77 |
| Aliquat 400 | 1:1 mixture Aliquats 26 and 221. | 48–52 |

These are commercial products and are produced from coconut oil and tallow. The alkyl groups in the salts correspond to the acids in these oils. Coconut oil contains 8.0 percent caprylic, 7.0 percent capric, 48.0 percent lauric, 17.5 percent myristic, 8.2 percent palmitic, 2.0 percent stearic, 6.0 percent oleic and 2.5 percent linoleic acid. Tallow contains 2.0 percent myristic, 32.5 percent palmitic, 14.5 percent stearic, 48.3 percent oleic and 2.7 percent linoleic acid.

For use in this invention these quaternary ammonium compounds are dissolved in an organic solvent which is not completely miscible with the aqueous solution. Solutions containing 0.5 to 10 percent by weight are generally desirable for convenience in handling. Suitable solvents include one or more of the following: various hydrocarbon solvents such as kerosene, diesel fuel, heptane, octane, benzene, toluene, xylene; halogenated hydrocarbons, such as carbon tetrachloride, chloroform, 1,1,2,2-tetrachlorethane, and 1,2,dichloro-1,2-difluoroethane; and ketones such as methyl ethyl ketone, and diethyl ketone.

In the practice of this invention, the solution of the quaternary ammonium compound is used to extract the alkaline uranium liquor, which should have a pH of at least 11 and, preferably 12 or higher. This is obtained by adding sufficient alkali to provide the equivalent of 5 to 15 grams of NaOH per liter. For effective extraction, the uranium-containing liquor is treated with 8-hydroxyquinoline in an amount sufficient to complex the uranium and commonly in amounts of 0.2 to 20 grams per liter. The 8-hydroxyquinoline can be more readily dispersed in the system by heating the solution because the solubility is thereby increased. It is within the scope of this invention to add part of the 8-hydroxyquinoline with the organic solvent.

The extraction can be effected in batch or continuous operation using procedures which are well known in the art. For example, batch operations can be effected in open or closed vessels using 0.1 to 10 volumes of the organic phase for each volume of the aqueous phase. The phases are mixed and then separated. Separation of the phases can be hastened by centrifuging, but gravity separation is effective.

The uranium values which are extracted with the organic phase can be recovered and the organic solvent and quaternary ammonium compound recycled in the process. One method for stripping the organic phase is to add a strong mineral acid, such as hydrochloric or sulfuric acid, and thereby acidify the organic phase. Mixtures of acid and an alkali metal salt of the acid are also applicable. For example, hydrochloric acid and sodium chloride can be used. The acid extract can be processed by well-known methods, and the organic phase recycled. The uranium compound, as recovered, can then be converted to any desired form.

The practice of this invention is demonstrated by the examples.

EXAMPLES

Part A.—Preparation of barren liquor

A uranium bearing ore containing 0.18 weight percent uranium as $U_3O_8$ was ground to less than 12 mesh. One thousand grams of the ground ore was extracted with 1222 grams of leach liquor which was prepared by dissolving 50 grams of sodium carbonate and 15 grams sodium bicarbonate per liter of solution. The suspension was treated with 1.25 grams of potassium permanganate and agitated by bubbling air through the suspension. The rate of air flow amounted to 1.31 liters per hour per 1000 grams of ore. After extraction at 90° C. for 18 hours the suspension was filtered. The filtrate was combined with another batch similarly prepared. The additional 1000 gram portions of the ore which were ground to less than 80 mesh were similarly extracted and the filtrates from the various extractions were combined.

A 2.5 liter portion of the filtrates was adjusted to pH 11.05 by addition of 34.9 milliliters of a sodium hydroxide solution. The sodium hydroxide solution contained 0.435 gram NaOH per milliliter. The resulting solution was treated with 59.6 milliliters of additional sodium hydroxide so as to supply excess sodium hydroxide in amount of 10 grams per liter, this giving a pH of 12.15. The resulting suspension was left to stand overnight at room temperature (20–25° C.). The next day the suspension was heated to 140° F. with stirring and after 4 hours was filtered. The resulting filtrate, herein designated as a barren liquor, was found to contain 0.10 percent by weight of uranium expressed as $U_3O_8$.

Part B.—Extraction of uranium from barren liquor

A 100 milliliter portion of the barren liquor was mixed with 0.6 gram of 8-hydroxyquinoline (6 grams per liter). The solution was heated to dissolve the 8-hydroxyquinoline; 20 milliliter portions of the solution were placed in centrifuge tubes and mixed with 60 milliliters of carbon tetrachloride solution containing 2.8 grams of Aliquat 221 (0.7 to 2.2 weight percent of dicoconut dimethylammonium chloride). The solution turned green and upon shaking, an unstable emulsion formed. On standing a few minutes the emulsion separated; however, to assure complete separation the tube was centrifuged for 15 minutes. The aqueous layer which was on top amounted to 20 milliliters and was found to contain 78.0 percent of the uranium initially present in the barren liquor. The carbon tetrachloride layer amounted to 60 milliliters and was found to contain 21.0 percent of the uranium.

In another run 20 milliliters of the barren liquor which had been treated with 8-hydroxyquinoline as described above was mixed with 60 milliliters of methyl ethyl ketone containing 3.4 grams Aliquat 400 (1.4 to 1.5 weight percent of coconut trimethylammonium chloride and 0.7 to 2.2 weight percent of dicoconut dimethylammonium chloride). The mixture was shaken and then centrifuged for 10 minutes. Addition of the methyl ethyl ketone solution did not cause development of a green color as noted when the chloroform solution was used. The top, organic layer amounted to 62.5 milliliters and contained 46.8 percent of the uranium.

For recovery of the uranium, 30 milliliters of 5 weight percent hydrochloric acid are added and the mixture agitated. The phases are separated and the aqueous phase concentrated to a point at which the uranium concentration is about 100 grams per liter. The uranium is then precipitated as ammonium diuranate by the addition of an excess of ammonia. The precipitate is recovered and dried.

These results demonstrate that the uranium contained in the barren liquor and which might be discarded in the processing of the ore can be concentrated and recovered by extraction with the method herein disclosed.

As many possible embodiments can be made of this invention without departing from the scope thereof, it is to be understood that all matter herein set forth is to be interpreted as illustrative and not as unduly limiting the invention.

We claim:
1. A process for the recovery of uranium values from an aqueous alkaline carbonate solution, comprising adding a compound of the structure

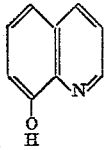

to form the corresponding uranium 8-quinolate, and 0.1 to 10 volumes per volume of said aqueous solution of an inert organic solvent not completely miscible with said aqueous solution, said organic solvent containing 0.5 to 10 percent by weight of a compound of the structure

where X is an anion selected from the group consisting of chloride, iodide, bromide, sulfate, phosphate, acetate, and hydroxide, $n$ is the valence of X, and each R is individually selected from the group consisting of hydrocarbon radicals containing 1 to 24 carbon atoms, the total number of carbon atoms in the sum of said R groups being in the range of 4 to 38, thoroughly mixing the resulting mixture, separating the aqueous and organic phases, said organic phase containing uranium values extracted from said aqueous phase.

2. A process for the recovery of uranium values from an aqueous alkaline carbonate solution containing at least 0.001 weight percent uranium expressed as $U_3O_8$, comprising dissolving in said aqueous solution 0.2 to 20 grams per liter of 8-hydroxyquinoline, adding per volume of said aqueous solution 0.1 to 10 volumes of an inert organic solvent not completely miscible with said aqueous solution, said organic solvent containing a compound of the structure

where X is an anion selected from the group consisting of chloride, iodide, bromide, sulfate, phosphate, acetate, and hydroxide, $n$ is the valence of X, and each R is individually selected from the group consisting of hydrocarbon radicals containing 1 to 24 carbon atoms, the total number of carbon atoms in the sum of said R groups being in the range of 4 to 38, thoroughly mixing the resulting mixture, separating the aqueous and organic phases, said organic phase containing uranium values extracted from said aqueous phase.

3. The process of claim 2 wherein said organic solvent is selected from the group consisting of kerosene, diesel fuel, heptane, octane, benzene, toluene, xylene, carbon tetrachloride, chloroform, 1,1,2,2-tetrachloroethane, 1,2-dichloro-1,2-difluoroethane, methyl ethyl ketone, and diethyl ketone.

4. A process for the recovery of uranium values from an aqueous alkaline carbonate solution containing at least 0.001 weight percent uranium expressed as $U_3O_8$, comprising dissolving in said aqueous solution 0.2 to 20 grams per liter of 8-hydroxyquinoline, adding per volume of said aqueous solution 0.1 to 10 volumes of carbon tetrachloride containing dissolved therein 0.5 to 10 weight percent of dicoconut dimethylammonium chloride, agitating the resulting mixture, and separating the aqueous and organic phases, said organic phase containing uranium values extracted from said aqueous phase.

5. A process for the recovery of uranium values from an aqueous alkaline carbonate solution containing at least 0.001 weight percent uranium expressed as $U_3O_8$, comprising dissolving in said aqueous solution 0.2 to 20 grams per liter of 8-hydroxyquinoline, adding per volume of said aqueous solution 0.1 to 10 volumes of methyl ethyl ketone containing dissolved therein 0.5 to 10 weight percent of a mixture of coconut trimethylammonium chloride and dicoconut dimethylammonium chloride, agitating the resulting mixture, and separating the aqueous and organic phases, said organic phase containing uranium values extracted from said aqueous phase.

6. A process for the recovery of uranium values from an aqueous alkaline carbonate solution containing 0.1 weight percent uranium expressed as $U_3O_8$, comprising dissolving 6 grams per liter of 8-hydroxyquinoline in said aqueous solution adding 3 liters per liter of said aqueous solution of carbon tetrachloride containing dissolved therein 0.7 to 2.2 weight percent of dicoconut dimethylammonium chloride, agitating the resulting mixture, and separating the aqueous and organic phases, said organic phase containing uranium values extracted from said aqueous phase.

7. A process for the recovery of uranium values from an aqueous alkaline carbonate solution containing 0.1 weight percent uranium expressed as $U_3O_8$, comprising dissolving 6 grams per liter of 8-hydroxyquinoline in said aqueous solution, adding 3 liters per liter of said aqueous solution of methyl ethyl ketone containing 1.4 to 1.5 weight percent of coconut trimethylammonium chloride and 0.7 to 2.2 weight percent of dicoconut dimethylammonium chloride, agitating the resulting mixture, and separating the aqueous and organic phases, said organic phase containing uranium values extracted from said aqueous phase.

References Cited in the file of this patent
UNITED STATES PATENTS 2,877,250    Brown et al. _____ Mar. 10, 1959

OTHER REFERENCES

Rodden et al.: "Analytical Chemistry of the Manhattan Project", VIII-1, pp. 12, 26 and 27 (1950), McGraw-Hill Book Co., Inc., N.Y.

Brown et al.: AECD-4142, May 27, 1954, pp. 15, 105 and 106.